United States Patent [19]

Hasegawa et al.

[11] Patent Number: 4,782,403
[45] Date of Patent: Nov. 1, 1988

[54] RECORDING APPARATUS

[75] Inventors: Masahide Hasegawa, Kanagawa; Makoto Fujiki, Tokyo, both of Japan

[73] Assignee: Canon Kabushiki Kaisha, Tokyo, Japan

[21] Appl. No.: 843,729

[22] Filed: Mar. 25, 1986

[30] Foreign Application Priority Data

Mar. 27, 1985 [JP] Japan .................................. 60-060896

[51] Int. Cl.⁴ .............................. G11B 5/03; G11B 27; G11B 02
[52] U.S. Cl. ...................................... 360/66; 360/14.1
[58] Field of Search ....................... 360/77, 66, 27, 61, 360/13, 14.1

[56] References Cited

U.S. PATENT DOCUMENTS

| | | | |
|---|---|---|---|
| 3,070,670 | 12/1962 | Eldridge et al. | 360/66 |
| 3,404,392 | 10/1968 | Sordello | 360/77 |
| 3,838,446 | 9/1974 | Otsuka et al. | 360/66 |

*Primary Examiner*—Vincent P. Canney
*Attorney, Agent, or Firm*—Toren, McGeady & Associates

[57] ABSTRACT

A recording apparatus of the kind forming recording tracks by recording both first and second information signals on a recording medium, including (a) an erasing device for erasing signals recorded on the recording medium; (b) a first erasing signal generating circuit which generates a first erasing signal for erasing only the first information signal; (c) a second erasing signal generating circuit which generates a second erasing signal for erasing both the first and second information signals; and (d) a switching circuit which supplies the erasing device with either the first erasing signal or the second erasing signal by switching them over one to the other.

9 Claims, 3 Drawing Sheets

RECORDING APPARATUS

BACKGROUND OF THE INVENTION

1. Field of the Invention

This invention relates to a recording apparatus for recording information signals on a magnetic recording medium.

2. Description of the Prior Art

Heretofore, there have been proposed and put into practice recording/reproducing apparatus of the kind arranged to have a second signal, which consists of pilot signals of one or a plurality of different frequencies lower than that of a first signal, recorded in superimposition on the first signal; and, in reproducing the record, to adjust the position of reproducing heads with respect to recording tracks on the recording medium, that is, to perform tracking control, by using the reproduced second signal. With the apparatus arranged in this manner, for inserting a different signal into the recorded signal, i.e. for performing an operation called insert recording, there have been known various methods including, for example, such methods as shown in FIGS. 4, 5 and 6 of the accompanying drawings.

In FIG. 4 which illustrates the state of recording tracks obtained in the event of insert recording, a signal A, representing the first signal, and pilot signals, representing the second signal, are recorded in tracks A1 to Ak on a record bearing medium or tape t. Among these tracks, an n number of tracks $Ai+1$ to $Ai+n$ are to be replaced with tracks B1 to Bn for recording a signal B that is different from the signal A in the event of insert recording.

It is important for such insert recording to secure, first of all, the continuity of joints between the tracks Ai and B1 and between the tracks Bn and $Ai+n+1$. It is also important to have the signal recorded with adequate quality in the new tracks B1 to Bn. To meet the former requirement, the signal B must be recorded in the tracks B1 to Bn under the tracking control accomplished by means of the pilot signals recorded in the tracks $Ai+1$ to $Ai+n$. To meet the latter requirement, the signal A, which is recorded in the tracks $Ai+1$, to $Ai+n$ must be erased either one by one or several tracks at a time before recording the signal B in the tracks B1 to Bn, by using an erasing head which is arranged to precede a recording head.

For carrying out these operations, in a method of the prior art, the tracking control is performed by reproducing the pilot signal recorded in the applicable part while leaving unerased some portion of the record of that part corresponding to a vertical retrace period not appearing in the picture. FIG. 5 shows insert recording performed by this method. The illustration includes a recording/reproducing head R; and an erasing head E. An arrow X indicates the travelling direction of the tape t. Another arrow Y indicates the shifting direction of the head. A reference symbol C denotes an erased part. Symbols $A'i+1$, $A'i+2$, $A'i+3$ and $A'i+4$ denote erased parts. An erasing current is cut off only while the erasing head E is passing the unerased part. Then, the pilot signal is reproduced for tracking control when the recording/reproducing head R passes this part.

FIG. 6 is an enlarged view showing the state of the track $A'i+4$ obtained with recording performed without leaving any guard band. The width WH of the head is arranged to be somewhat wider than a track pitch WP. Therefore, the overlapping width W1 between the adjacent track $A'i+3$ and the erasing head E obtained at a period T1 within a period T, during which the erasing head E passes through the track $A'i+4$, differs from the overlapping width W2 between the adjacent track B3 and the erasing head E obtained during another period T2. Therefore, the tracking control cannot be performed during the period T1 during which the overlapping width is at the value of width W1.

Meanwhile, the erasing head E is provided with more than two gaps. As a result, a boundary kb between the tracks B4 and $A'i+4$ and a boundary kc between the track $A'i+4$ and an erased part C are not clear, as shown in FIG. 6. Therefore, an effective period for tracking control is shorter than the period of time T1.

The timing at which the erasing head E and the recording/reproducing head R pass the track $A'i+4$ fluctuates due to some disturbance. Besides, since the period T is determined by the signal B to be newly recorded, the positions of the tracks $A'i+1$ to $A'i+4$ fluctuate and deviate on the tape t due to the fluctuation of the signal B and the fluctuation of the shift of the head. These conditions further shortens the period of effective tracking control. Then, such short effective period of tracking control brings about a serious disadvantage against disturbance, noises and drop-out.

SUMMARY OF THE INVENTION

It is an object of this invention to provide a recording apparatus which is capable of erasing only a desired one of information signals recorded on a recording medium without necessitating any complex arrangement.

Under this object, a recording apparatus which is arranged according to this invention as an embodiment thereof to form recording tracks by recording first and second information signals together on a recording medium comprises: erasing means for erasing signals recorded on the recording medium; first erasing signal generating means which generates a first erasing signal for erasing only the first information signal; second erasing signal generating means which generates a second erasing signal for erasing both the first and second information signals; and switching means which supplies said erasing means with either the first erasing signal or the second erasing signal by switching them over from one to the other.

It is another object of this invention to provide a recording apparatus which is capable of adequately replacing a signal recorded on a recording medium with a new signal. Under that object, another embodiment of this invention is a recording apparatus of the kind capable of recording a new first information signal on a recording medium having a first signal and a second signal, which is of frequency lower than that of the first signal, already recorded thereon, which comprises: erasing means for erasing only the first signal recorded on the recording medium; recording means for recording the new first signal; and control means for controlling the positions of the recording medium and the recording means relative to each other by detecting the second signal and by performing the position control according to the result of detection of the second signal.

Further objects and features of this invention will become apparent from the following detailed description of a preferred embodiment thereof taken in connection with the accompanying drawings.

DETAILED DESCRIPTION OF THE PREFERRED EMBODIMENT

An embodiment of this invention is arranged as described below with reference to FIGS. 1 to 3.

Figure 2:
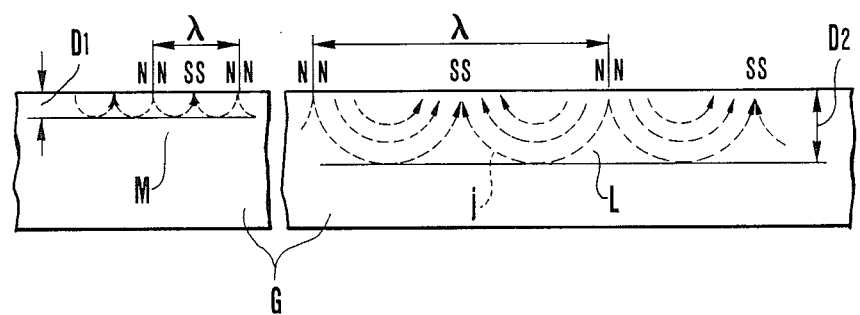
FIG. 2 is an enlarged cross-sectional view of the magnetic film provided over a tape.

Generally, in magnetic recording, the magnetization depth of a magnetic layer G varies with recording wavelength $\lambda$ as shown in the sectional view of the magnetic layer G of FIG. 2. The longer the wavelength of a signal L, the deeper a magnetic flux j and the magnetic layer G is magnetized down to a deep part D2. In the case of a signal M of a shorter wavelength, a magnetization depth D1 is shallow. Accordingly, in carrying out an erasing operation, the erasable depth varies with the magnitude of the erasing current, an erasing wavelength, the width of the gap of the erasing head, etc. Therefore, proper selection of these factors through a suitable changeover means enables only the signal M of the short wavelength to be erased.

Further, the pilot signals to be used for tracking control are generally of a wavelength which is much longer than that of a video signal obtained through a signal processing operation. It is, therefore, possible to leave the pilot signals alone unerased as mentioned above. In an embodiment of this invention, therefore, insert editing, or recording, is arranged to be carried out by switching one erasing signal over to another. This embodiment is arranged as follows.

Figure 1:
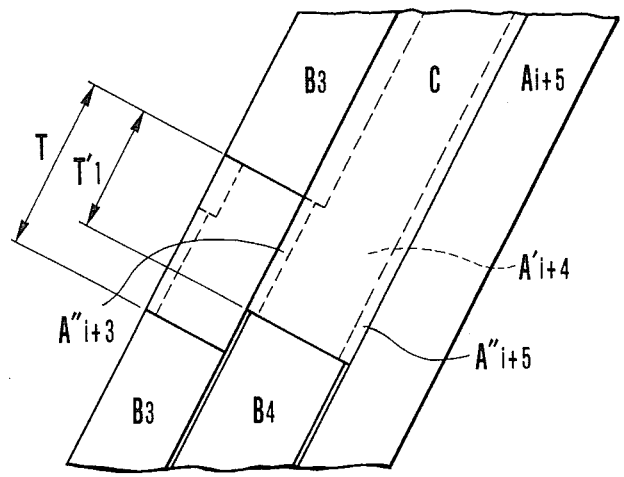
FIG. 1 is an illustration of a track pattern obtained by insert editing or recording performed by an apparatus arranged according to this invention.

Referring to FIG. 1, with the tracking control operation arranged to be performed by reproducing the pilot signal at a part such as a vertical retrace period or the like in the same manner as in the case of the prior art example mentioned in the foregoing, a track pattern becomes as shown in FIG. 1. A part C is erased by an erasing head E which is slightly wider than a recording-/reproducing head R. Compared with the prior art example mentioned in the foregoing, the embodiment obviates the necessity of providing the switch-over timing for the erasing head E. Further, there will be no blurred part that results from the double gap arrangement. Therefore, almost the whole of a tracking period can be used for tracking control. This obviates the necessity for timing adjustment. Further, parts A"i+3 and A"i+5 result from an erasing operation on tracks Ai+3 and Ai+5 respectively.

In cases where a head other than the recording/reproducing head is mounted on a rotary cylinder, the tracking control can be performed by reproducing the pilot signals always by means of that head.

Further, in the event of an apparatus arranged to use a plurality of rotary heads for recording or reproduction, the number of rotary erasing heads may be reduced to one by arranging the erasing head E to have a width which is several times as wide as a track pitch WP. Further, with the exception of insert recording, an arrangement to increase the magnitude of the erasing current or to reduce the frequency thereof or to do both of these adjusting operations in combination in erasing the pilot signals of long wavelengths permits more adequate erasing operation.

Figure 3:
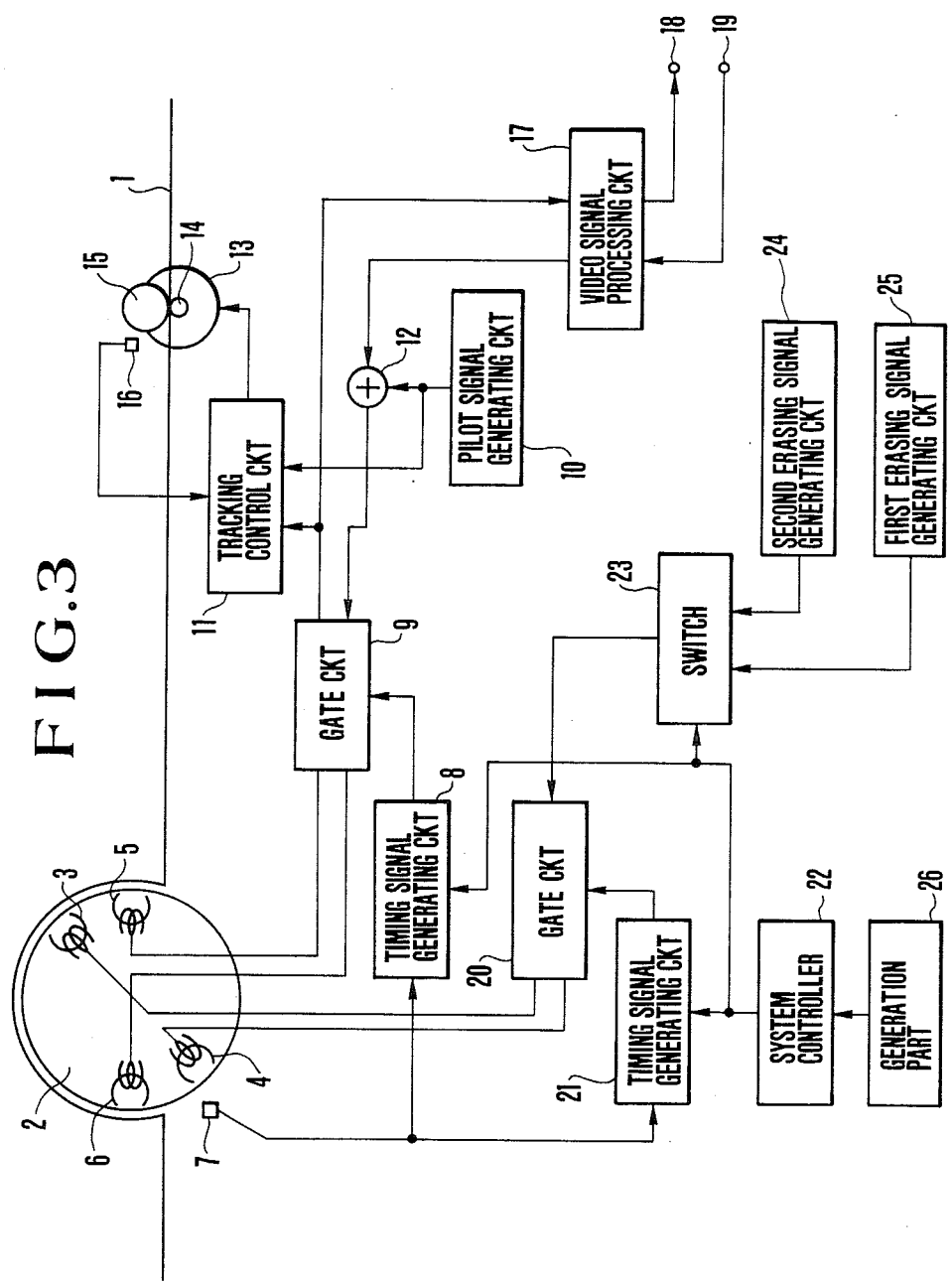
FIG. 3 is a schematic diagram showing an apparatus arranged to permit the insert editing shown in FIG. 1.
Figure 4:
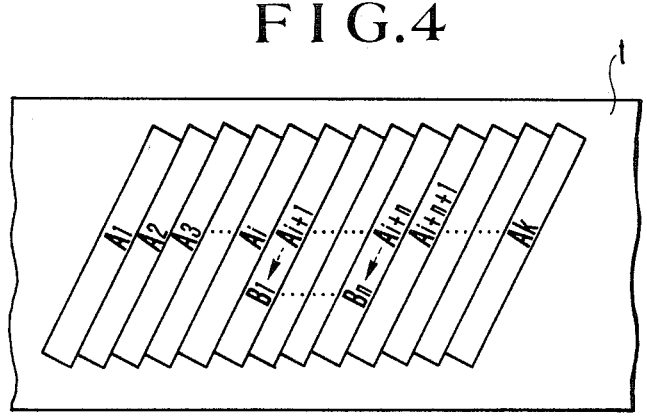
FIG. 4 is an illustration of tracks formed by insert editing performed in a conventionally employed manner.
Figure 5:
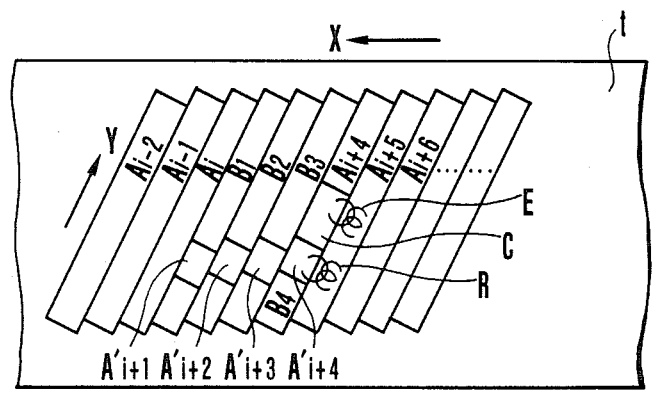
FIG. 5 shows a track pattern under the conventional insert editing operation.
Figure 6:
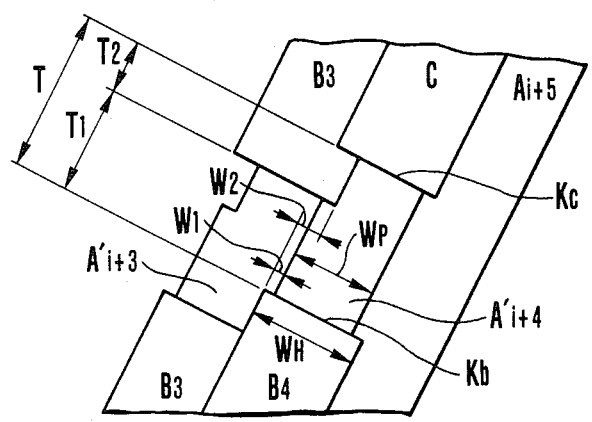
FIG. 6 is an enlarged illustration of an unerased part A'i+4.

The above-stated insert recording can be carried out by an apparatus which is arranged according to this invention as shown in FIG. 3. The illustration includes a magnetic tape 1; and heads 3, 4, 5 and 6 which are carried by a rotary cylinder 2. The heads 3 and 4 are erasing heads while other heads 5 and 6 are video signal recording or reproducing heads respectively.

For normal recording, the apparatus operates as follows: A video signal which comes via a terminal 19 is subjected to a known signal processing operation at a video signal processing circuit 17. Then, the above-stated tracking control pilot signals which are produced from a pilot signal generating circuit 10 are superimposed on the processed video signal in a combining circuit 12. The output signal of the combining circuit 12 is distributed via a gate circuit 9 to the heads 5 and 6 at a predetermined timing. These heads 5 and 6 then record the signal on the magnetic tape 1 while forming the recording tracks in a manner as described in the foregoing. The timing for the gating operation of the gate circuit 9 is controlled by timing pulses produced from a timing signal generating circuit 8 on the basis of a rotation detection pulse signal (PG signal) which is produced from a rotation detector 7 arranged to detect the rotation of the cylinder 2.

An erasing operation during normal recording is as follows: In this case, the erasing operation is performed with a second erasing signal which is of a relatively low frequency and/or of a large amplitude as mentioned in the foregoing. The second erasing signal, which is generated by an erasing signal generating circuit 24, is supplied via a switch 23 to a gate circuit 20. This signal is then supplied to the heads 3 and 4 at a predetermined timing. Upon receipt of the second erasing signal, the heads 3 and 4 perform erasing according to this signal prior to recording by the heads 5 and 6. The gate timing for the erasing operation is controlled by timing pulses which are generated by a timing signal generating circuit 21 on the basis of the PG signal. Further, the timing signal generating circuits 8 and 21 and the switch 23 are arranged to operate under the control of a system controller 22.

The embodiment performs insert recording in the following manner: When an operation part 26 is operated to select an insert recording position thereof, the system controller 22 produces an instruction for insert recording. In response to this instruction, the timing signal generating circuit 8 connects the heads 5 and 6 to the recording circuit system during a period other than a period T shown in FIG. 1 and to a reproducing circuit system during a period T'1 shown in FIG. 1. Meanwhile, at least for the period T shown in FIG. 1, the switch 23 allows an erasing signal generating circuit 25 to supply the gate circuit 20 with a first erasing signal which is of a short wave length and/or short amplitude. The first erasing signal is arranged to have such a frequency and an amplitude that the above-stated tracking control pilot signals are never erased.

When the heads 5 and 6 are connected to the reproducing circuit system, the reproduction outputs of these heads are supplied to a tracking control circuit 11. The tracking control circuit 11 is arranged to form a tracking control signal (ATF signal) by using the reproduced pilot signal in a known manner and to control a capstan 14 with the tracking control signal. The illustration of FIG. 3 further includes the fly-wheel 13 of the capstan 14; a pinch roller 15; a rotation detector 16 which is arranged to detect the rotation of the flywheel 13; and an output terminal 18 which is arranged to produce the reproduced video signal.

The apparatus which is arranged as described above permits erasing operations in varied manners and enables the apparatus to accomplish an insert recording operation in an excellent manner.

What is claimed is:

1. A recording apparatus in which new image signals are recorded on a recording track of a recording medium having already recorded image signals, said recording track having image signals including a synchronizing signal and a tracking control pilot signal with a lower frequency than that of the image signals recorded together on the same recording track, comprising:
    (A) a recording head for recording the image signals and the tracking control pilot signal by tracing the recording track on the recording medium;
    (B) an erasing head for erasing the signals recoded on the recording track on the recording medium by tracing the recording track on the recording medium ahead of the recording head;
    (C) an erasing signal generating means for generating a first erasing signal for erasing only the image signals recorded on the recording track on the recording medium, and a second erasing signal for erasing the image signals and the tracking control pilot signal recorded on the recording track on the recording medium by the recording head; and
    (D) output control means for controlling the outputs of various kinds of signals for the recording head and the erasing head in such a manner that in case new image signals are to be recorded on a recording track on which image signals have already been recorded, only the image signals on a part of the recording track are erased by supplying the first erasing signal generated by the erasing signal generating means to the erasing head, while the image signals and the tracking control pilot signal on the other part of the recording track are erased by supplying the second erasing signal generated by the erasing signal generating means to the erasing head, and only the new image signals are recorded by the recording head on the predetermined part of the recording track where only the image signals have been erased, while the new image signal and a tracking control pilot signal are recorded on said other part of the recording track where both the image signals and the tracking control pilot signal have been erased.

2. An apparatus according to claim 1, wherein the recording medium includes a magnetic recording medium.

3. An apparatus according to claim 1, wherein the recording head is aranged to record the image signals on an upper layer of the magnetic recording medium and the tracking control pilot signal on the lower layer.

4. An apparatus according to claim 3, wherein the second erasing signal is lower in frequency and larger in amplitude than the first erasing signal.

5. An apparatus according to claim 1, wherein the output control means is arranged to control the erasing signal generating means so as to erase the part corresponding to the vertical return line period of the already recorded image signals out of the recording tracks according to the first erasing signal by the erasing head, and to erase the part corresponding to the other period of said image signals according to the erasing signal by said erasing head.

6. A recording apparatus in which new image signals are recorded on a recording track of a recording medium having already recorded image signals, said recording track having image signals including a synchronizing signal and a tracking control pilot signal with lower frequency than that of the image signals recorded together on the same recording track, comprising:
    (A) a recording or reproducing head for reproducing the signal recorded on the recorded track or for recording the image signal on the recording track by tracing the recording track on the recording medium;
    (B) an erasing head for erasing the signals recorded on the recording track on the recording medium by tracing the recording track on the recording medium ahead of the recording or reproducing head;
    (C) erasing signal generating means for generating a first erasing signal for erasing only the image signals recorded on the recording track on the recording medium, and a second erasing signal for erasing the image signals and the tracking control pilot signal recorded on the recording track on the recording medium by the recording or reproducing head;
    (D) tracking control means for controlling the tracking of the recording or reproducing head on the recording medium by using the tracking control pilot signal reproduced by the recording or reproducing head; and
    (E) input output control means for controlling the input and the output of various kinds of signals for the erasing head and the recording or reproducing head in such a manner that in case new image signals are to be recorded on a recording track on which image signals are already recorded, only the image signals are erased by delivering the first erasing signal generated by the erasing signal generating means to the erasing head while a predetermined part of the recording track is being traced by the erasing head, and the imaging signals and the tracking control pilot signal are erased by delivering said second erasing signal generated by the erasing signal generating means to the erasing head while the other part of the recording track is being traced by the erasing head, and, while the recording or reproducing head is tracing a part of said recording track corresponding to a vertical return line period of the already recorded image signals, the tracking control pilot signal recorded on the part corresponding to said vertical return line period is reproduced so as to control the tracking by the tracking control means, and while a part other than the part corresponding to said vertical return line period is being traced, new image signals and a pilot signal are recorded by the recording or reproducing head.

7. An apparatus according to claim 6, wherein the recording medium includes a magnetic recording medium.

8. An apparatus according to claim 7, wherein the recording or reproducing head is arranged so as to record the image signals on an upper layer of the magnetic recording medium and the tracking control pilot signal on a lower layer.

9. An apparatus according to claim 6, wherein the input output control means is arranged to control said erasing signal generating means so as to deliver said first erasing signal generated by the erasing signal generating means to the erasing head while the erasing head is tracing the part of the recording track corresponding to the vetical return line period of the already recorded image signals and to deliver said second erasing signal generated by the erasing signal generating means to the erasing head while the erasing head is tracing the part of the recording track other than the part, corresponding to the vertical return line period.

* * * * *